(12) United States Patent
Koop et al.

(10) Patent No.: US 8,699,381 B2
(45) Date of Patent: Apr. 15, 2014

(54) ASCERTAINING PRESENCE IN WIRELESS NETWORKS

(75) Inventors: Lamonte Peter Koop, Alpharetta, GA (US); Edward Allen Payne, Lawrenceville, GA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/620,309

(22) Filed: Sep. 14, 2012

(65) Prior Publication Data

US 2013/0070676 A1  Mar. 21, 2013

Related U.S. Application Data

(63) Continuation of application No. 12/696,044, filed on Jan. 28, 2010, now Pat. No. 8,300,551.

(60) Provisional application No. 61/147,917, filed on Jan. 28, 2009.

(51) Int. Cl.
*H04L 12/28* (2006.01)

(52) U.S. Cl.
USPC .......................... 370/254; 370/229; 370/252

(58) Field of Classification Search
USPC ......... 370/228, 229, 252, 254, 310, 312, 315, 370/338, 329, 400; 709/227–230, 238, 242, 709/202
See application file for complete search history.

(56) References Cited

U.S. PATENT DOCUMENTS

| | | | |
|---|---|---|---|
| 2003/0037167 A1* | 2/2003 | Garcia-Luna-Aceves et al. | 709/238 |
| 2003/0045295 A1* | 3/2003 | Stanforth | 455/445 |
| 2004/0233855 A1* | 11/2004 | Gutierrez et al. | 370/252 |
| 2007/0189191 A1* | 8/2007 | Ades | 370/254 |
| 2008/0186984 A1* | 8/2008 | Nakano | 370/400 |
| 2009/0154345 A1* | 6/2009 | Schollmeier et al. | 370/228 |
| 2010/0014444 A1* | 1/2010 | Ghanadan et al. | 370/310 |

* cited by examiner

*Primary Examiner* — Hassan Phillips
*Assistant Examiner* — Ajay Cattungal
(74) *Attorney, Agent, or Firm* — Tillman Wright, PLLC; Chad D. Tillman; Jeremy C. Doerre

(57) ABSTRACT

One of many aspects of the invention relates to an ad hoc network in which inbound messages are communicated from an originating node to a gateway node via a plurality of intermediate nodes. In this respect, a method performed by an intermediate node in communicating the inbound message to the gateway node includes: maintaining a routing table; and using the routing table, selecting a node for use as the next hop by determining whether a maximum number of allowable hops for an inbound message is exceeded by using such node, and comparing a preference of using such node to preferences of using other known nodes by which the maximum number of allowable hops would not be exceeded. Another aspect includes sending a "leave" message when an intermediate node leaves the ad hoc network, whereby the intermediate node is removed from similar routing tables maintained by other intermediate nodes.

20 Claims, 11 Drawing Sheets

| Address | Hop Count | Qualifier |
|---|---|---|
| UID 123456 | 7 | 45 |
| UID 456789 | 4 | 85 |
| UID 789012 | 9 | 02 |

*FIG. 6*

| Nodes | No. of Hops per Node | No. of Nodes | Total No. of Node Hops (Retransmissions) |
|---|---|---|---|
| 211, 213, 215 | 8 | 3 | 24 |
| 217, 219, 221 | 6 | 3 | 18 |
| 223, 225, 227 | 4 | 3 | 12 |
| 229, 231, 233 | 2 | 3 | 6 |
| 235, 237, 239 | 0 | 3 | 0 |
| | | | 60 |

Table 1

FIG. 13

ASCERTAINING PRESENCE IN WIRELESS NETWORKS

CROSS-REFERENCE TO RELATED APPLICATION

The present application is a U.S. continuation patent application of, and claims priority under 35 U.S.C. §120 to, U.S. nonprovisional patent application Ser. No. 12/696,044, filed Jan. 28, 2010 now U.S. Pat. No. 8,300,551, which nonprovisional patent application published as U.S. patent application publication no. 2010/0238940, which patent application and any patent application publications thereof are incorporated by reference herein, and which '044 application is a U.S. nonprovisional patent application of, and claims priority under 35 U.S.C. §119(e) to, U.S. provisional patent application Ser. No. 61/147,917, filed Jan. 28, 2009, which provisional patent application is incorporated by reference herein. A copy of this provisional patent application is attached hereto as Appendix A, which Appendix is incorporated herein by reference.

INCORPORATION BY REFERENCE

U.S. Patent Application Publication No. 2007/0002792, U.S. Patent Application Publication No. 2007/0002793, U.S. patent application Ser. No. 12/608,837, and any publications thereof, including U.S. Patent Application Publication No. 2010/0150026, and any patents issuing from any of the foregoing, are hereby incorporated herein by reference.

Additionally, the present application hereby incorporates herein by reference each of the following identified U.S. patent applications—as well as any publications thereof and any patents issuing therefrom; the following identified U.S. patent application publications; and the following identified U.S. patents: Ser Nos. 12/607,040; 12/609,009; 12/609,008; 12/608,837; 12/468,047; 12/367,544 (US 2009-0135000 A1); Ser. No. 12/367,543 (US 2009-0161642 A1); Ser. No. 12/367,542 (US 2009-0181623 A1); Ser. No. 12/353,197 (US 2009-0129306 A1); Ser. No. 12/352,992 (US 2009-0122737 A1); Ser. No. 12/343,865 (US 2009-0104902 A1); Ser. No. 12/343,822 (US 2009-0103462 A1); Ser. No. 12/271,850 (US 2009-0092082 A1); Ser. No. 12/140,253 (US 2008-0303897 A1); Ser. No. 11/930,797 (US 2008-0151850 A1); Ser. No. 11/930,793 (US 2008-0112378 A1); Ser. No. 11/930,788 (US 2008-0165749 A1); Ser. No. 11/930,785 (US 2008-0143484 A1); Ser. No. 11/930,782 (US 2008-0212544 A1); Ser. No. 11/930,779 (US 2008-0129458 A1); Ser. No. 11/930,777 (US 2008-0111692 A1); Ser. No. 11/930,770 (US 2008-0144554 A1); Ser. No. 11/930,761 (US 2008-0112377 A1); Ser. No. 11/930,753 (US 2008-0142592 A1) now U.S. Pat. No. 7,535,339; Ser. No. 11/930,749 (US 2008-0130536 A1) now U.S. Pat. No. 7,538,658; Ser. No. 11/930,740 (US 2008-0150723 A1) now U.S. Pat. No. 7,538,657; Ser. No. 11/930,736 (US 2008-0143483 A1) now U.S. Pat. No. 7,538,656; Ser. No. 11/847,309 (US 2007-0291724 A1); Ser. No. 11/847,295 (US 2007-0291690 A1); Ser. No. 11/832,998 (US 2007-0273503 A1) now U.S. Pat. No. 7,378,959; Ser. No. 11/832,991 (US 2007-0268134 A1) now U.S. Pat. No. 7,378,958; Ser. No. 11/832,979 (US 2007-0268126 A1) now U.S. Pat. No. 7,378,957; Ser. No. 11/610,427 (US 2007-0159999 A1); Ser. No. 11/618,931 (US 2007-0155327 A1); Ser. No. 11/555,173 (US 2007-0099629 A1); Ser. No. 11/555,164 (US 2007-0099628 A1); Ser. No. 11/465,466 (US 2007-0043807 A1); Ser. No. 11/465,796 (US 2007-0041333 A1); Ser. No. 11/460,976 (US 2008-0315596 A1); Ser. No. 11/428,536 (US 2007-0002793 A1); Ser. No. 11/428,535 (US 2007-0002792 A1); Ser. No. 11/425,047 (US 2007-0069885 A1) now U.S. Pat. No. 7,554,442; Ser. No. 11/425,040 (US 2006-0287008 A1) now U.S. Pat. No. 7,539,520; Ser. No. 11/424,850 (US 2007-0004331 A1); Ser. No. 11/424,849 (US 2007-0004330 A1) now U.S. Pat. No. 7,574,168; Ser. No. 11/424,847 (US 2007-0001898 A1) now U.S. Pat. No. 7,583,769; Ser. No. 11/424,845 (US 2006-0287822 A1) now Us. Pat. No. 7,574,300; Ser. No. 11/423,127 (US 2006-0289204 A1) now U.S. Pat. No. 7,563,991; Ser. No. 11/422,306 (US 2006-0282217 A1) now U.S. Pat. No. 7,542,849; Ser. No. 11/422,304 (US 2006-0276963 A1) now U.S. Pat. No. 7,526,381; Ser. No. 11/422,321 (US 2006-0276161 A1); Ser. No. 11/422,329 (US 2006-0274698 A1) now U.S. Pat. No. 7,529,547; Ser. No. 11/306,765 (US 2008-0136624 A1) now U.S. Pat. No. 7,394,361; Ser. No. 11/306,764 (US 2006-0237490 A1) now U.S. Pat. No. 7,391,321; Ser. No. 11/193,300 (US 2007-0024066 A1) now U.S. Pat. No. 7,438,334; Ser. No. 11/161,550 (US 2007-0002808 A1) now U.S. Pat. No. 7,430,437; Ser. No. 11/161,545 (US 2006-0018274 A1) now U.S. Pat. No. 7,221,668; Ser. No. 11/161,542 (US 2006-0023679 A1) now U.S. Pat. No. 7,522,568; Ser. No. 11/161,540 (US 2007-0004431 A1) now U.S. Pat. No. 7,200,132; Ser. No. 11/161,539 (US 2006-0023678 A1) now U.S. Pat. No. 7,209,468; Ser. No. 10/987,964 (US 2005-0093703 A1) now U.S. Pat. No. 7,155,264; Ser. No. 10/987,884 (US 2005-0093702 A1) now U.S. Pat. No. 7,133,704; Ser. No. 10/604,032 (US 2004-0082296 A1) now U.S. Pat. No. 6,934,540; Ser. No. 10/514,336 (US 2005-0215280 A1) now U.S. Pat. No. 7,209,771; and Ser. No. 09/681,282 (US 2002-0119770 A1) now U.S. Pat. No. 6,745,027.

Each of the foregoing patent application publications and patents is hereby incorporated herein by reference for purposes of disclosure of class-based network (CBN) technology, wake-up (WU) technology, and class-based networks that utilize such technologies (such as those of TeraHop Networks, Inc. of Alpharetta, Ga.), and systems employing such technologies including, inter alia: (1) implementations in the first responder context; (2) implementations in container tracking and monitoring context; and (3) implementations in equipment tracking and monitoring, especially rental construction equipment. It is intended that the CBN and WU technologies, and related features, improvements, and enhancements, as disclosed in these incorporated references may be utilized in combination with various embodiments and implementations of the present invention.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to ascertaining presence in wireless networks.

A need exists for improvement in such presence ascertainment. This, and other needs, are addressed by one or more aspects of the present invention.

SUMMARY OF THE INVENTION

The present invention includes many aspects and features. Moreover, while many aspects and features relate to, and are described in, the context of wireless radio networks, the present invention is not limited to use only in such context, as will become apparent from the following summaries and detailed descriptions of aspects, features, and one or more embodiments of the present invention.

Accordingly, one aspect of the present invention relates to a method, in an ad hoc network in which inbound messages are communicated from an originating node to a gateway node via a plurality of intermediate nodes, performed by an intermediate node in communicating the inbound message to the gateway node. The method includes the steps of maintaining a routing table including a set of one or more rows, wherein each row of the set comprises fields including, a next hop address, representing a unique address of a node, a next hop hopcount, representing a hop count to the gateway, and a next hop qualifier, representing a preference to using a node as a next hop towards a gateway node relative to other nodes that may be used as a next hop towards a gateway node, all fields of the row being pertaining to a known intermediate node for use as a next hop towards the gateway node; selecting a node for use as the next hop towards the gateway node for communicating the inbound message to the gateway node by, determining whether a sum of the next hop hopcount from a row and a current hopcount of the inbound message exceeds a maximum number of allowable hops for an inbound message, and comparing a next hop qualifier of a row to a next hop qualifier of another row, wherein, for both rows, the maximum number of allowable hops for an inbound message is not exceeded, and communicating the inbound message to the node identified by the next hop address for which the next hop qualifier is determined to be preferred based on said comparison.

In a feature of this aspect of the invention, the step of comparing a next hop qualifier of a row to a next hop qualifier of another row comprises determining whether numeric values representing the next hop qualifiers are equal.

In a feature of this aspect of the invention, the gateway node maintains pathways among the nodes based on the messages received from each of the other nodes.

In a feature of this aspect of the invention, the next hop hopcount in a row represents a hop count to the gateway node from the node corresponding to the next hop address of that row.

In a feature of this aspect of the invention, the step of comparing a next hop qualifier of a row to a next hop qualifier of another row comprises determining which of two numeric values representing the next hop qualifiers is greater than the other.

In a feature of this aspect of the invention, the step of comparing a next hop qualifier of a row to a next hop qualifier of another row comprises determining which of two numeric values representing the next hop qualifiers is less than the other.

In a feature of this aspect of the invention, said step of determining whether a sum of the next hop hopcount from a row and a current hopcount of the inbound message exceeds a maximum number of allowable hops for an inbound message is performed before said step of comparing a next hop qualifier of a row to a next hop qualifier of another row, wherein, for both rows, the maximum number of allowable hops for an inbound message is not exceeded.

In a feature of this aspect of the invention, said step of comparing a next hop qualifier of a row to a next hop qualifier of another row, wherein, for both rows, the maximum number of allowable hops for an inbound message is not exceeded is performed before said step of determining whether a sum of the next hop hopcount from a row and a current hopcount of the inbound message exceeds a maximum number of allowable hops for an inbound message.

In a feature of this aspect of the invention, said step of determining whether a sum of the next hop hopcount from a row and a current hopcount of the inbound message exceeds a maximum number of allowable hops for an inbound message and said step of comparing a next hop qualifier of a row to a next hop qualifier of another row, wherein, for both rows, the maximum number of allowable hops for an inbound message is not exceeded are performed a plurality of times corresponding to the number of rows currently in the routing table being maintained.

In a feature of this aspect of the invention, the next hop qualifier is determined, at least in part, based on a general traffic load of the node to which the next hop qualifier pertains.

In a feature of this aspect of the invention, the next hop qualifier is determined, at least in part, based on transmission failure counts of the node to which the next hop qualifier pertains.

In a feature of this aspect of the invention, the next hop qualifier is determined, at least in part, based on signal strength of the node to which the next hop qualifier pertains.

In a feature of this aspect of the invention, the next hop qualifier represents both efficiency and success probability associated with using the node to which the next hop qualifier pertains as the next hop towards the gateway node for communicating the inbound message.

In a feature of this aspect of the invention, the method further includes updating a next hop qualifier pertaining to a node upon a communication with such node.

In a feature of this aspect of the invention, the method further includes updating a next hop qualifier pertaining to a node upon each communication with such node.

In a feature of this aspect of the invention, the method further includes updating a next hop qualifier pertaining to a node upon receiving a communication from such node.

In a feature of this aspect of the invention, the method further includes updating a next hop qualifier pertaining to a node upon receiving an acknowledgment associated with such node.

In a feature of this aspect of the invention, wherein an intermediate node does not maintain a routing table of entire pathways from the originating node to the gateway node.

In a feature of this aspect of the invention, the method further includes transmitting a message for receipt by each hop address in the table when the intermediate node leaves the ad hoc network.

In a feature of this aspect of the invention, the method further includes transmitting a leaving message for receipt by nodes corresponding to each next hop address in the table when the intermediate node leaves the ad hoc network.

In a feature of this aspect of the invention, each intermediate node is a captured node.

In a feature of this aspect of the invention, the intermediate node sends a message to the gateway node for each new node that is added to the routing table, the message identifying the new node.

In a feature of this aspect of the invention, the gateway node maintains pathways among the nodes based on messages received from the nodes.

In a feature of this aspect of the invention, the ad hoc network comprises a class-based network.

In a feature of this aspect of the invention, each set of one or more rows is associated with a class.

In a feature of this aspect of the invention, each row of the routing table is associated with a class.

In a feature of this aspect of the invention, the routing table is a first routing table associated with a first class, and further comprising the step of maintaining a second routing table including a set of one or more rows, wherein each row of the set comprises fields including, a next hop address, representing a unique address of a node, a next hop hopcount, representing a hop count to the gateway, and a next hop qualifier, representing a preference to using a node as a next hop towards a gateway node relative to other nodes that may be used as a next hop towards a gateway node, all fields of the row being pertaining to a known intermediate node for use as a next hop towards the gateway node; wherein the second routing table is associated with a second class.

In a feature of this aspect of the invention, the step of selecting a node for use as the next hop towards the gateway node comprises determining, based on a class of an incoming message, whether to select a node corresponding to a row of the first routing table or the second routing table.

Another aspect of the present invention relates to a computer-readable medium containing computer-executable instructions for performing a method in accordance with one or more aspects of the present invention.

Another aspect of the present invention relates to a communications device serving as the intermediate node performing a method in accordance with one or more aspects of the present invention and including a computer-readable medium in accordance with one or more aspects of the present invention.

Another aspect of the present invention relates to a method performed, in an ad hoc network in which inbound messages are communicated from an originating node to a gateway node via a plurality of intermediate nodes and a root primary node, by each intermediate node in communicating the inbound message to the gateway node via the root primary node. The method includes the steps of maintaining a routing table including a set of one or more rows, wherein each row of the set comprises fields including, a next hop address, representing a unique address of another node, a next hop hopcount, representing the hop count to the gateway from the other node, and a next hop qualifier, representing a preference to using the other node as a next hop towards a gateway node relative to yet other nodes that may be used as a next hop towards a gateway node, all fields of the row being pertaining to a known node for use as a next hop of the inbound message; selecting one of the known nodes for use as the next hop of the inbound message by, determining whether a sum of the next hop hopcount from a row and a current hopcount of the inbound message exceeds a maximum number of allowable hops for an inbound message, and comparing a next hop qualifier of a row to a next hop qualifier of another row both rows for which the maximum number of allowable hops for an inbound message is not exceeded; and communicating the inbound message to the node identified by the next hop address for which the next hop qualifier is determined to be preferred based on said comparison.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIG. 6 illustrates an exemplary next-hop table stored at an RSN.

FIG. 13 illustrates that a check-in message originating at node 219 requires three hops to get from node 219 to the gateway 241 in the exemplary network 210 of FIG. 12.

DETAILED DESCRIPTION

Figure 1:
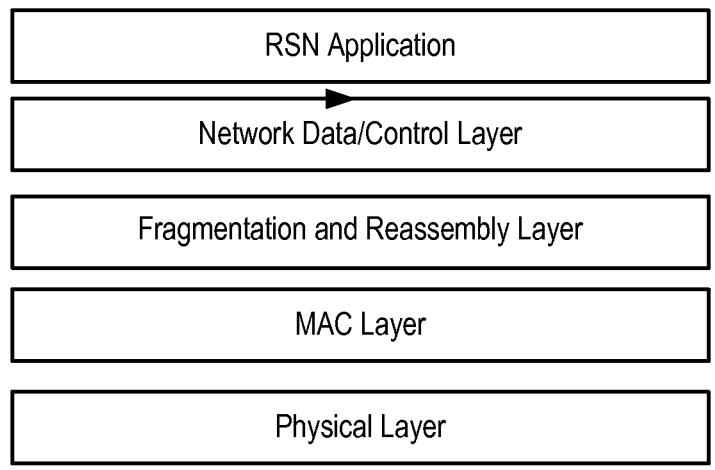
FIG. 1 illustrates layers of an architectural model of computer networking in accordance with a preferred communication system of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim 1tself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Radio Networks

A radio network in accordance with one or more preferred embodiments comprises a gateway server, one or more gateways (or gateway routers), and a plurality of remote sensor nodes (RSNs). Each RSN preferably includes CBN and RCR technology as described hereinbelow. Each gateway is preferably connected to the gateway server, which comprises software and a computing device on which that software runs. A gateway that is connected to a gateway server is characterized as captured, while a gateway that is not connected to a gateway server is characterized as free. Similarly, an RSN that is connected to a radio network is characterized as captured, while an RSN that is not connected to a radio network is characterized as free.

When an RSN is captured by a radio network, the RSN can be characterized as a node of the radio network, and can function as both an end point and a routing device. Further, each gateway includes a gateway RSN, which functions as a communication interface with other RSNs. Thus, in a radio network, each gateway, just like each RSN, can be characterized as a node.

A gateway and gateway server together collectively comprise a gateway controller (GC). Such a gateway controller can switch between functioning solely as a gateway, and functioning as a gateway controller. A gateway and gateway server that are integrated together can be characterized as an integrated gateway controller, while a gateway and gateway server that are physically separate, and preferably connected by a high-capacity, high-reliability data link, can be characterized as a logical gateway controller.

An overview of wake-up and class based networking technology preferably utilized in preferred radio networks will now be provided.

Wake-Up Technology

Although transmissions from a wireless node consume battery power, it is a node's receiver that usually limits battery life. Typically, a node's receiver is always on so that transmissions from other nodes can be received at any time. Since this receiver is usually similar in complexity and capability to the transmitter from which data is received, the receiver drains significant current from the node's battery. Even when this receiver is cycled on and off, thus reducing its average current drain, battery life is still limited to days or weeks without re-charging.

Receiver current consumption can be dramatically improved by using a wake-up transceiver to turn on a complex transceiver. This wake-up transceiver technology is patented by TeraHop Networks, Inc. (see U.S. Pat. No. 7,209,771, incorporated above by reference, and the patents related thereto). Using this wake-up technology, a complex transceiver is turned on generally only when needed to transfer data.

A wake-up transceiver achieves low current drain by virtue of its simplicity, thus the term reduced complexity radio. In addition to the exceptionally long battery life (measured in years) that results from the use of wake-up transceivers, the conserved battery and minimal required operating time of a complex transceiver allows a high-power complex transceiver to be utilized for transferring data. Thus, the use of RCRs provides both long battery life and long range.

Class-Based Networking

Class-based networking (CBN) technology is patented by TeraHop Networks, Inc. (see U.S. Pat. No. 6,745,027, incorporated above, and the related patents thereto). In accordance with CBN technology, each node in a class-based network has at least one network class identifier, or more generally, one common designation, assigned to it. Wireless ad hoc hierarchical networks form using transceivers of these nodes. Preferably, the transceiver is a standards-based radio, and the node also includes a second low-power wake-up radio and a controller. The controller operates per class-based networking protocols and per self-configuration protocols that are optimized for class-based networking. This combination enables autonomous reconfiguration and behavioral changes of the node in response to changes in the node's location, the presence of other nodes, changes in a battery level of the node, environmental changes, or other changes.

Conventional wireless ad hoc networks form based on physical proximity and/or based on an effective radio range of nodes of the network. Only those nodes that are in radio range of one another (which typically means that they are physically close to one another) can communicate with each other and form a network.

In contrast, a class-based network forms among those nodes that have at least one network class identifier in common. The nodes still must be within radio range of at least one other node of the same class, but other nodes that may be in close proximity but are not of the same class are ignored (and those other nodes ignore all nodes not in their classes).

Various Preferred Implementations

The long battery life and long range of RSNs, provided by the use of class-based networking and wake-up transceivers, makes true monitoring and tracking of mobile and/or movable assets practical. This practicality opens up many inventive implementations having benefits the desires for which have long been felt, but the means for which have heretofore been unobtainable.

First Responder Implementation

In a first-responder application, RSNs are worn by firefighters and/or other first responders, and gateway controllers are mounted to trucks and engines. As firefighters get into a truck to respond to a fire, a gateway controller on that truck automatically notes the presence of those on board via their RSNs.

On scene, a gateway controller on an incident commander's vehicle automatically notes the arrival of the truck, and the truck's gateway controller communicates to the incident commander's gateway controller the identities of those present in the truck. The incident commander's gateway controller then communicates this data associated with the arrival to an application on the incident commander's laptop. This information (and information pertaining to other trucks) is displayed on the incident commander's laptop. A cellular link from the incident commander's gateway controller to dispatch conveys GPS data of the incident and the identity of all units present, preferably for graphical display.

As the incident progresses, the incident commander makes assignments using his laptop. Based on these assignments, commands are sent to the RSNs at the scene, such as, for example to change classes and corresponding behavior. These changes could include having an RSN detect the absence of motion, thereby allowing the RSN to function as an alarm indicating that a firefighter is in distress, thus supplementing traditional PASS (personal alert safety system) devices. As trucks and firefighters depart (either at the conclusion of the incident or otherwise), the incident commander's laptop automatically informs the incident commander that these departing trucks and firefighters are no longer present, thus supplementing other accountability measures.

Once firefighters and trucks have arrived back at their stations, gateway controllers located at each station automatically report their return to dispatch and upload incident records to an archive for later analysis.

The long battery life facilitated by wake-up transceivers and class-based networking obviates the need to recharge (and to remember to recharge) an RSN, or even to have to remember to turn it on. The RSN is always on, and can even be worn off-duty. Class designations on RSNs and gateways can also help keep different services (fire, police, EMS) and different jurisdictions from becoming confused.

The RSNs' long range afforded by their high-power data radios and the capabilities of autonomous network configuration facilitate good coverage at the incident scene, as firefighters move around, including in buildings. Further, due to the area-coverage capability of the radio network, the presence of firefighters and their vehicles can be known without the incident commander ever laying eyes on them. Special tag readers and "passports" are similarly not required.

Shipping Container Implementation

In a shipping container application, an RSN is integrated with a security bolt, which is applied as a security seal through the container door hasp. Gateway controllers are located at origin and destination sites, and at various intermediate locations along a shipping route (e.g., ports, truck stops, weigh stations).

At the shipper's location, sealing of the door is automatically reported to a gateway controller at the shipping dock and, via a user application, associated with a shipment number. After leaving the shipper's location, a lack of presence would automatically be reported.

Arrival of the RSN at a port would automatically be detected and reported by gateways at the port. Even from inside a stack of containers, messages from the RSN could reach a gateway, and vice-versa, due to the high-powered data radios and the hopping that is facilitated by autonomous network configuration, which is enabled by class-based networking. If a container is moved when it should not be (indicating theft), or if a container is jarred enough to damage its contents, the event is reported immediately and automatically. Similarly, an RSN preferably reports dangerous fluctuations in a container's temperature or the presence of dangerous vapors, if connected to appropriate external sensors.

Aboard ship, the presence of the container is known to a gateway controller on the ship, which reports via satellite link. Similarly, sensor inputs are known. The location of the container is also known, from the GPS capability of the shipboard gateway controller.

Once the container reaches its destination, or at any location subsequent to the original sealing, every opening or closing of the seal is recorded. If the opening or closing occurs at a location covered by a radio network, the event is reported immediately. If the opening or closing occurs at a non-covered location, the event is stored and reported immediately upon encountering a radio network.

In such an application, class-based networking provides more than enough battery life to complete multiple door-to-door transoceanic shipments. It also enables different shippers or different shipping companies to share a radio network infrastructure at ports and other shared locations without interfering with each other's traffic, while still allowing for hopping of others' messages when needed.

For example, XYZ Shipping may configure its RSNs to communicate, under normal circumstances, with only other XYZ Shipping RSNs, but to assist hopping for RSNs of other companies when needed. Under those ordinary circumstances, wake-up and data traffic from other companies' RSNs would be ignored by XYZ Shipping's RSNs. However, if ABC Shipping has a container deep in a stack, and its RSN needs a hop-assist to reach a gateway controller, the RSNs of XYZ Shipping could make the assist. Preferably, the ABC Shipping RSN automatically makes a request for an assist after failing to reach a gateway controller using only its own class of RSNs. In this manner, class-based networking facilitates handling thousands of containers at a single location.

The area-coverage capability of the radio network means, for example, that an entire port facility may be covered. Consequently, the presence of an RSN (and thus its associated container) can be known at any time (via a query), and special detection lanes or choke points are not needed.

Construction Equipment Implementation

In a construction equipment application, an RSN is attached to a backhoe, dozer, crane, or other piece of equipment. In this application, gateway controllers are located at equipment rental yards and construction sites. A rental company then uses presence data generated by the RSN network to know in real-time which of multiple yards specific equipment is located to meet customer needs, in real-time. Preferably, improper movement data triggers a theft alarm. Such a theft alarm could be associated with gates and perimeter fencing as well as rental assets.

At a renter's construction site, a gateway receives engine-hours data from RSNs associated with equipment at that site and reports back to the rental company. The rental company uses the data to determine whether the renter is exceeding his contract and/or whether the equipment is being abused. Preferably, for sites that do not have a gateway controller, the rental company uses a truck-mounted gateway controller to periodically visit all such sites to collect data from the RSNs at each such site. The data is collected quickly and automatically, and is immediately uploaded via cellular link to the rental company's headquarters.

A construction company can similarly use the system to keep track of and monitor its own equipment, both in storage yards and on construction sites. For construction sites that have both rental and owned equipment, classes are set such that a rental company can "see" its equipment via the site's gateway, but see nothing of the equipment owned by the construction company.

Other Implementations

Although some applications of radio networks utilizing CBN and WU technology have been described, it will be appreciated that many other applications are possible. In general, appropriate applications have high-utility, high-value assets that change operational location, are bigger than a breadbox but smaller than a house, are not powered for long periods or at all, dwell temporarily, and/or that, are remotely located or spend long periods unattended. These assets may be in regular use, stored, and/or pre-positioned/configured for emergency use.

Network Communication

In a radio network, communication from one end point to another end point, such as from an originating RSN to a gateway, or from a gateway to a destination RSN, is hopped along intermediate nodes. Generally, communication between nodes along a path, i.e. communication associated with a node's routing functionality, is provided by the MAC layer or the network layer, while communication between the end points is provided by the application layer.

In a preferred implementation, each RSN is implemented using RCR technology. An RCR of each RSN provides low power consumption, reasonably low network bandwidth utilization, and flexible ad-hoc message routing, but is not intended for large payloads or streaming data. The RCR protocol is broken down into 2 distinct sub-protocols representing two distinct layers, i.e. the MAC layer and the network layer. Further, the network layer is subdivided into a reassembly and fragmentation (FAR) layer, and a data control layer. FIG. 1 illustrates these layers.

Network Communication—MAC Layer

Figure 2:
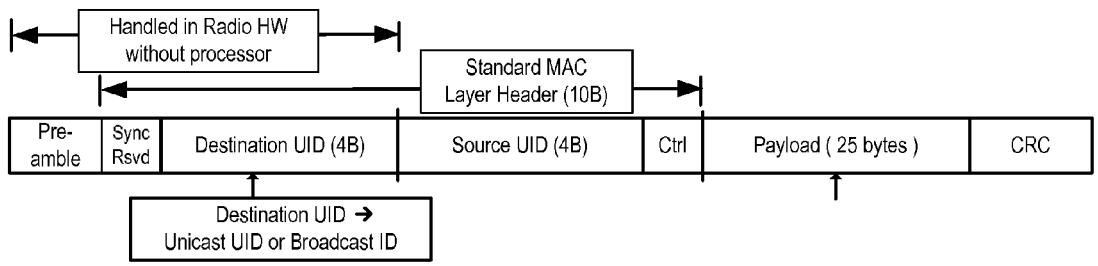
FIG. 2 illustrates a payload-carrying frame in accordance with a preferred embodiment of the present invention.
Figure 3:
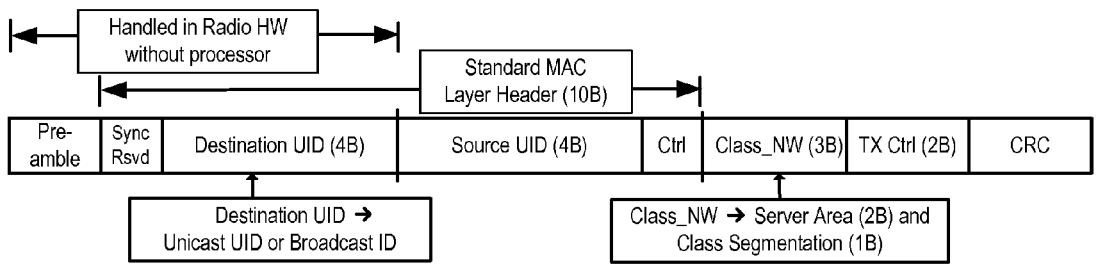
FIG. 3 illustrates an RCR Wakeup/Attention frame in accordance with a preferred embodiment of the present invention.

All node to node communications are implemented via node transactions at the MAC layer. A node initiates a transaction by transmitting a series of wakeup/attention (WU_ATTN) frames in repeated succession. The number of transmissions in the series is selected to ensure that the receiving device will "see" one of these frames within the total transmission sequence. These WU_ATTN frames differ from normal payload carrying frames. More specifically, they are differentiated by a different TYPE field within a frame control (CTRL) byte. FIG. 2 illustrates a normal payload carrying frame and FIG. 3 illustrates a WU_ATTN frame. (Notably, WU_ATTN frames may not be required prior to communication with a gateway, as described hereinbelow.)

Each node is associated with a unique identifier (UID). Upon receiving a WU_ATTN frame, a node verifies that the frame contains either its UID, or a general broadcast address, which may comprise, for example, all is. As can be seen in FIG. 3, a destination UID corresponding to either a unicast destination node, or a general broadcast address, is located within the first five bytes. Due to this location, the processor will not have to wake up unless the message is directed to its UID or is a broadcast/all call message.

The node additionally verifies that the WU_ATTN frame includes a proper Area ID. As described more fully hereinbelow, an Area ID corresponds to a particular gateway server. If an Area ID contained in the WU_ATTN frame differs from an Area ID stored at the node upon joining the network as described hereinbelow, then the node will not respond to the WU_ATTN frame.

Similarly, the node verifies that the frame contains an allowable network class identifier. If a network class identifier of the frame does not correspond to a network class identifier stored at the node, the node will not respond to the WU_ATTN frame. This network class identifier may comprise all or part of a Class ID, or may comprise a wholly different network class identifier. A node may contain multiple network class identifiers, for example, a node may be configured to contain up to six network class identifiers.

The node further verifies appropriate sequencing. The CTRL byte includes frame sequence information, as well as including an indication of whether a message is an acknowledgment (ACK) and an indication of whether an acknowledgment is required. A frame sequence of all ones denotes the special WU_ATTN frame.

Further, the receiving node will not respond to any WU_ATTN frame if it is in the free state, unless the WU_ATTN frame is part of the process of becoming joined to, or "captured" by, a network.

Assuming successful reception by a receiving node of a WU_ATTN frame which corresponds to the receiving node's UID and verifies as allowed based on the sequencing, Area ID, and Class ID of the frame, the receiving node will then wait until the transmitting node completes its entire sequence of WU_ATTN frames. This time to wait is calculated using a counter contained in TX count information of the TX CTRL field of the WU_ATTN frame. After waiting for an amount of time calculated based on this counter, the receiving node will acknowledge a successful wakeup to the transmitting node and change its receive channel to the data channel specified in TX data channel information of the TX CTRL field of the WU_ATTN frame. A disallowed transmission may be negatively acknowledged utilizing the same sequence, with a reason code set within an acknowledgment frame. A transmitting node that receives such a negative acknowledgment ceases its attempts to continue the transaction.

After switching to a specified channel for an allowed transaction, a transmitting node transmits a plurality of data packets on the specified channel. This plurality of data packets collectively form a sequenced and potentially fragmented datagram. If all data packets are received at the receiving node and the full datagram is reassembled in its entirety, then the receiving node will acknowledge to the transmitting node that the transaction is complete. If one or more data packets are corrupted or otherwise in error, the receiving node will provide a negative acknowledgment to the transmitting node, and the transmitting node will repeat the transmission up to a maximum of three times.

Notably, the above sequence describes unicast node transactions, i.e. transmissions to a receiving node that specifies the UID of that receiving node. Broadcast transactions, i.e. transmissions that specify a general broadcast address, follow a similar sequence except in that no acknowledgments of any type are provided by a receiving node.

Network Communication—Network Layer

Figure 4:
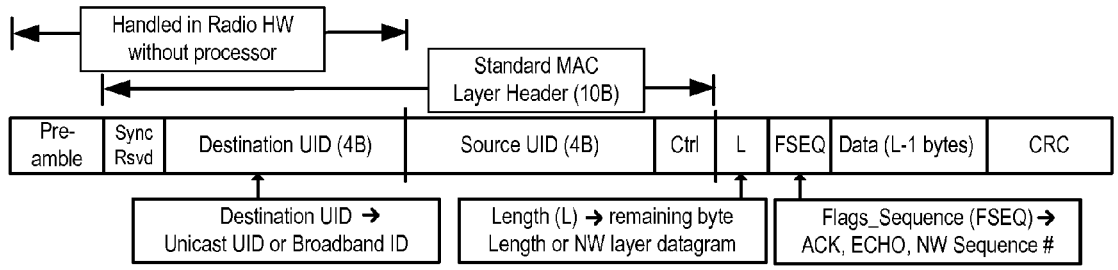
FIG. 4 and FIG. 5 illustrate exemplary messaging with respect to layers of FIG. 1.
Figure 5:
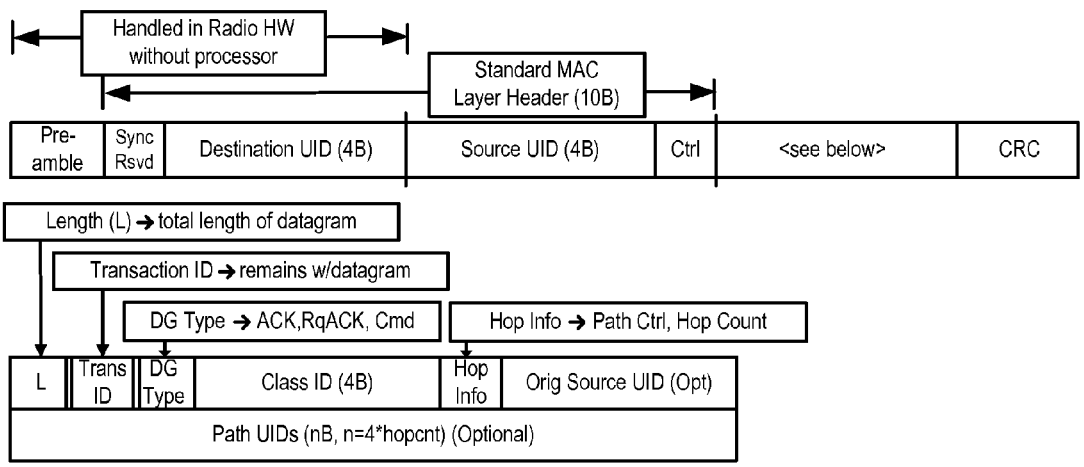

With both broadcast and unicast transactions, a successfully received transaction will be forwarded up to the network layer of the protocol stack for further processing. The network layer resides on top of the MAC layer and includes the FAR layer and the data control layer. FIGS. 4 and 5 illustrate exemplary messaging at each of these layers.

Communication routing within the network is characterized as asymmetrical. This is because routing of data from an RSN inbound to a gateway, i.e. inbound data, is handled differently than routing of data outbound from a gateway to an RSN, i.e. outbound data. Both inbound and outbound routing will now be described.

Network Communication—Network Layer—Inbound Routing

Inbound data routing utilizes a next hop approach, i.e. each node is unaware of an entire path needed to deliver a datagram to a gateway, and is instead only aware of specific nodes which are potential "next hops", i.e. potential next destinations for an inbound datagram.

Each captured node of the network contains a next hop table with three entries corresponding to three potential next hop nodes. Each entry includes an address, i.e. the UID of that next hop node, a hop count, representing a number of hops required to reach the gateway node using that next hop node, and a qualifier, as illustrated in FIG. 6. The qualifier is a number from zero to one hundred which indicates a next hop node's preferability as determined by several factors, with higher numbers indicating less desirability. Whenever a first node communicates with another node in the course of routing data, acknowledgments of that data contain indicators of a general traffic load of that other node. The first node uses this information, as well as transmission failure counts and, when available, signal strength indications to generate the qualifier value corresponding to other nodes. A qualifier corresponding to a particular node is updated each time communication occurs with that particular node. The qualifier corresponding to each node can be used to "qualify" and order nodes for use in routing.

When selecting a next hop node to forward a datagram to, both efficiency, i.e. hop counts of potential next hop nodes, and a probability of success, i.e. the chance that a transmission will fail to reach its destination, are taken into account. Inbound datagrams contain a current hop count which starts at zero and is incremented with each node traversed, i.e. with each hop. A node preferably utilizes this current hop count in conjunction with the hop count corresponding to each potential next hop node in its next hop table to select a next hop node such that the datagram will not exceed a maximum system hop count.

A node acquires its next hops, i.e. populates its next hop table, either when it first joins a network by listening for broadcast traffic, or by requesting that available nodes around it signal their status as potential next hops. A node makes such a request by broadcasting a NEXTHOP_REQUEST datagram. When a node receives such a request, it utilizes a random back-off timer, and then responds in kind to signal that it is a potential next hop. Use of the random back-off timer helps ensure that responses from a plurality of nodes are spread out, rather than being received all at once, thus likely allowing more to propagate through.

A node issues a NEXTHOP_REQUEST when there are no valid next hop entries in its next hop table. A next hop entry corresponding to another node is invalidated when an attempt to communicate with the other node fails, or if the hop count of the entry indicates that routing communications through the other node would cause the soon-to-be-requesting node to have a hop count greater than the maximum system hop count.

A node also issues a NEXTHOP_REQUEST when two next hop entries in its next hop table are invalid or empty, and the qualifier associated with each entry is a high value. In this case, a NEXTHOP_REQUEST is sent to attempt to find new next hop nodes with better qualifiers. Notably, however, such a request is only sent when network traffic is at a minimum and is only sent at a very low rate. An exponential back-off timer is utilized to prevent a node with poor next hop qualifiers from continually and rapidly sending out NEXTHOP_REQUESTs.

A NEXTHOP_REQUEST broadcast by a requesting node includes a hop count of the requesting node. In order to minimize possible path loop issues and maintain network efficiency, any node which receives the NEXTHOP_REQUEST does not respond to the request if its hop count is greater than the hop count of the requesting node. Additionally, upon receiving responses to its NEXTHOP_REQUEST, the requesting node validates the hop count of each responding node against its own perceived hop count. Similarly, no node will respond to a NEXTHOP_REQUEST if its hop count is greater than or equal to the maximum system hop count, and no requesting node will validate a response from a node whose hop count is greater than or equal to the maximum system hop count.

It will frequently be the case that a requesting node does not have any valid entries in its next hop table, and thus essentially has no hop count. A requesting node which does not have any valid entries in its next hop table sets its hop count to negative one (4) to indicate that all nodes receiving its NEXTHOP_REQUEST should respond, and validates a response from any node whose hop count is less than the maximum system hop count.

If a node broadcasts a NEXTHOP_REQUEST and receives no replies, the node retries this request three times, utilizing an exponential back-off timer between each retry. If, following the third retry, the node has still not received a reply and no next hop has been acquired, the node will transition to a free state, i.e. consider itself removed from the network. (It is noteworthy that each of these three retries may be retried utilizing a different network class identifier, which may comprise a different Class ID. Further, each of these retries may be retried utilizing soft-preferential class based networking.)

On the other hand, any node which does acquire a new next hop, either via a NEXTHOP_REQUEST or from listening to network traffic, sends a NEXTHOP_UPDATE datagram containing the current entries in its next hop table to the gateway for forwarding to a gateway server. NEXTHOP_UPDATE is the only network layer datagram which requires a gateway response. After beginning a transaction by sending a NEXTHOP_UPDATE, a node queues the transaction as pending awaiting acknowledgment by the gateway. The node uses its current known hop count to determine a time frame, such as 3 seconds per hop, within which an acknowledgment response should be received. If no acknowledgment is received during this time frame and the current information in its next hop table is still valid, the node retries sending the NEXTHOP_UPDATE. If, during this process, the node determines that information (i.e. one or more entries) in its next hop table is not valid, then it updates this information, possibly using NEXTHOP_REQUEST as described hereinabove. The node continues to retry sending a NEXTHOP_UPDATE datagram until either an acknowledgment is received or the node determines that it is no longer part of the network and is in a free state.

When a node receives an inbound datagram from another node, assuming the node includes one or more valid next hop entries in its next hop table, the node will forward the datagram to a selected most desirable next hop in its next hop table, the selection being guided by various factors as described hereinabove. Before forwarding the datagram, however, the forwarding node inserts its own UID. As a datagram travels along a path and traverses a plurality of nodes, each node insert its own UID, thus generating path information for the path the datagram has taken.

After selection by a forwarding node of a next node to hop to from its next hop table, transmission of the datagram to that next node may fail. In this event, the forwarding node selects a different next node to hop to from its next hop table. If transmission to each potential next hop node in its next hop table fails, the forwarding node broadcasts a NEXTHOP_REQUEST to attempt to obtain valid next hop entries. During this time, the datagram to be routed is kept queued and ready for transmission. Thus, even if a transmission fails, if the forwarding node is able to acquire a valid next hop, then the datagram continues on a path to the destination gateway.

If, on the other hand, the attempt to acquire a valid next hop is unsuccessful, the forwarding node generates a FAILED_ROUTE datagram, which is a copy of the original datagram to be forwarded with its type set to a FAILED_ROUTE enumerator. The forwarding node utilizes the path information within the original datagram to forward the FAILED_ROUTE datagram back to the originating node of the original datagram. This message may or may not propagate back to the originating node. Nodes receiving a FAILED_ROUTE datagram along a path back to the originating node can retry forwarding the message along a different path to the destination gateway by selecting a different next hop node from their next hop table if routing conditions permit, e.g. if the next hop table includes other valid entries. FAILED_ROUTE datagrams utilize outbound routing mechanisms as described hereinbelow.

A FAILED_ROUTE datagram will also be generated if the hop count corresponding to each potential next hop in a next hop table of a forwarding node is such that the maximum system hop count would be exceeded utilizing any of the potential next hops. This case is potentially a common occurrence. To more rapidly propagate hop count changes, all network datagram node to node acknowledgments contain the current hop count of the receiving node.

Network Communication—Network Layer—Outbound Routing

In contrast to inbound routing, outbound routing preferably utilizes a simple "known route" approach. As described hereinabove, path information is appended to a datagram as it travels inbound towards a gateway. This inbound path information is used to generate an outbound full path and store the UID of each node along this full path within a network header. An outbound datagram can thus be identified by the use of a FULL_PATH option within a network header, and a final destination which is not a known gateway. When a node receives an outbound datagram, the node removes its own UID from the full path and then forwards the datagram to the node corresponding to the next UID in the full path. If this forwarding fails, the node retries three times, unless a negative acknowledgment is received that informs the forwarding node that the datagram cannot be received.

If each of these three retries is also unsuccessful, the forwarding node converts the datagram to a broadcast message that is set, with DG_ECHO, to cause nodes receiving the broadcast to repeat the broadcast. If such a broadcast datagram is received by the final destination node, the final destination node updates the path information of the gateway/gateway server. If the datagram is destined for the application layer, then this update can be accomplished via a reply generated by an application at the node. If, however, the datagram is not destined for the application layer, this update can be accomplished via a NEXTHOP_UPDATE.

Network Communication—Application Layer

Network communication is completed at the application layer. Where the MAC and network layers can be characterized as providing node to node communication and path discovery, the application layer can be characterized as providing end to end communication.

With the notable exception of NEXTHOP_UPDATE, network layer communication does not typically include end to end acknowledgment capability. This is essentially because it is not required at a base level. The utilization of FAILED_ROUTE network datagrams provides meaningful levels of reverse communication in the event of a routing breakdown.

However, most application layer communication will desire acknowledgment that communication with a final destination occurred successfully. Therefore the application layer utilizes a protocol of its own which provides end to end acknowledgment capability. As the network layers view data sent from an overlying application as simply raw data, this application protocol is thus fully encapsulated and acted upon by the application alone.

Preferably, an application within an RSN is ultimately be in control of the networking layers, regardless of the fact that these layers can act autonomously in terms of routing network datagrams and seeking out networks and routing paths. Thus, since this application is ultimately responsible for network system activities such as registration and authentication, the application can shut down the network layers in the event that such activities are unsuccessful.

Network Formation

Figure 7:
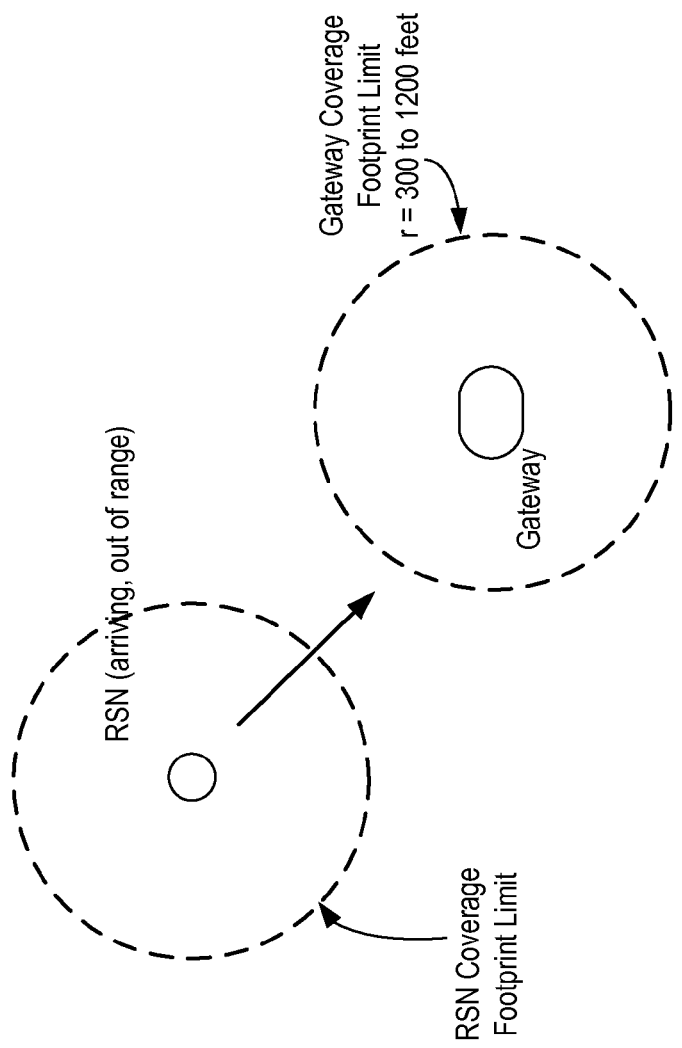
FIG. 7 illustrates an exemplary radio network which comprises a gateway and an RSN, i.e., a node, in accordance with a preferred embodiment of the present invention.

Radio network formation between a captured gateway and an RSN, i.e. a node, is now described with reference to an exemplary radio network. FIG. 7 illustrates this exemplary radio network, which comprises a gateway and an RSN, i.e. a node. The gateway has a coverage area indicated by the dotted circle surrounding it. Preferably, this coverage area has a radius of 300 to 1200 feet. As illustrated in FIG. 7, an RSN is currently out of range, but is moving towards the gateway's coverage area such that it may soon be in range, and thus be able to connect to the gateway.

It is a characteristic of the system that RSNs arrive and depart from coverage areas at any time, in any order, and even randomly change position relatively within a coverage area. A free RSN that becomes aware of a radio network, attempts, if appropriate, to connect wirelessly to that radio network.

Network Formation—Beaconing

In order to make a free RSN aware of a nearby radio network, a process known as beaconing is used. More specifically, a beacon is a radio signal that is periodically broadcast by a node, e.g. a gateway, that contains identification information (as well as a check-in period, as described hereinbelow). The beacon effectively announces the presence of a gateway and identifies it. The identification information includes an address of a node that broadcast the beacon, an Area ID corresponding to a gateway server the node that broadcast the beacon is associated with, and a network class identifier. This network class identifier may comprise all or part of a Class ID (as described hereinbelow), or may comprise a wholly different network class identifier.

When a free RSN receives such a beacon, the network class identifier contained in the beacon is compared to one or more network class identifiers contained in the RSN, at the MAC layer of the RSN. If the network class identifier of the beacon matches any network class identifier contained in the RSN, information contained in the beacon is passed to the network layer of the RSN, which informs the application layer of the RSN of a detected radio network as well as information associated therewith, including the Area ID and node address. The RSN, at the application level, decides whether or not to activate the network layer of the RSN, i.e. attempt to join the radio network and transition the RSN to a captured state. If the RSN decides to join the radio network, the network layer will utilize the node address as a next hop and transmit a communication (which preferably contains a network class identifier of the RSN, and if the RSN contains multiple network class identifiers then preferably includes a primary network class identifier, e.g. a primary Class ID, as described hereinbelow), to the node, for communication to the gateway server corresponding to the Area ID, to attempt to register with the gateway server. Upon attempting to register, the RSN enters a tentative capture state. During this tentative capture state, the tentatively captured RSN can communicate over the radio network, but no other RSN can hop messages through the tentatively captured RSN.

Registration is dependent upon the application layer, as described more fully hereinbelow, and the RSN remains in the tentative capture state until an affirmative acknowledgment of registration is received, at which time the node transitions to being fully captured by the radio network. Each RSN stores the Area ID of the gateway server it is currently associated with. Notably, a negative acknowledgment (NACK) could be received instead, thus indicating that the RSN is not allowed to join the network. Each RSN stores a list of Area IDs that it is not allowed to attach to. If a node receives a negative acknowledgment upon an attempt to join a radio network corresponding to a particular Area ID, it places that Area ID within this list of Area IDs that it is not allowed to attach to. Notably, it is possible for registration to be dependent upon a human decision utilizing a customer application, and it is possible for an RSN to move directly into a full captured state if desired.

Figure 8:
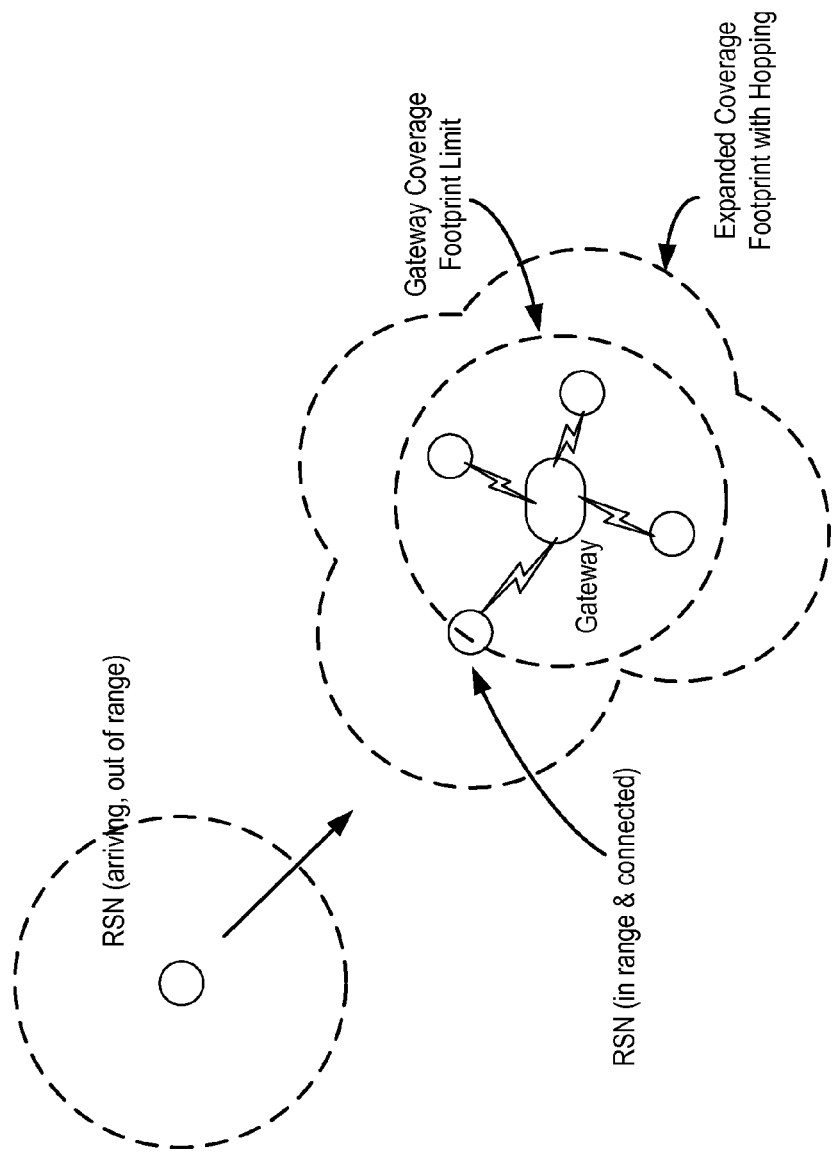
FIG. 8 illustrates a radio network comprising a gateway and four RSNs with an expanded coverage area, in accordance with a preferred embodiment of the present invention.
Figure 9:
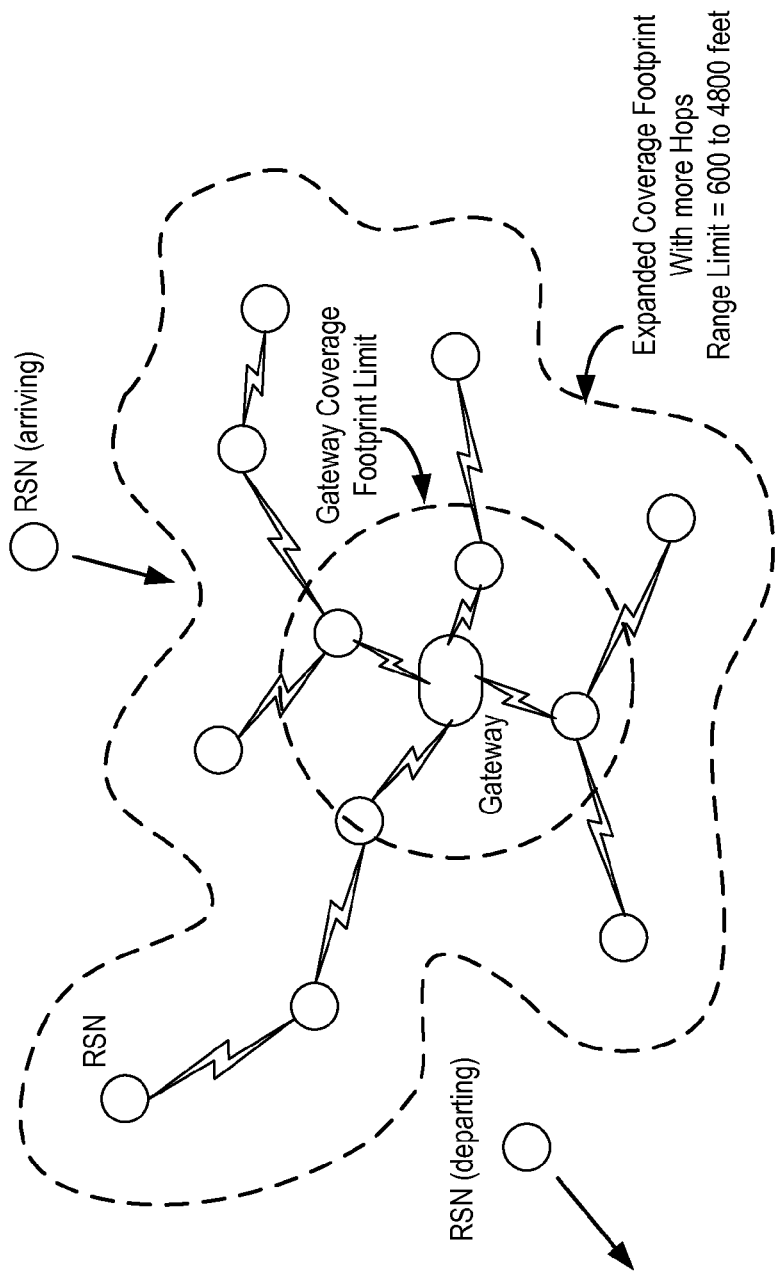
FIG. 9 illustrates an expanded footprint of a gateway resulting from RSN hopping in accordance with a preferred embodiment of the present invention.

Once in a captured state, an RSN ignores messages associated with other gateway servers, i.e. messages including other Area IDs (as described hereinabove and described more fully hereinbelow). After being captured by a radio network, an RSN serves to expand the coverage area of the radio network. This is because RSNs are configured to retransmit, or pass, messages from other RSNs, as described more fully hereinbelow, such that the coverage area of the radio network is greater than just the coverage area of the gateway itself. FIG. 8 illustrates a radio network comprising a gateway and four RSNs with an expanded coverage area. The coverage area is expanded to include a coverage area of each of the four RSNs. This is because a message can be hopped through any of the four RSNs on its way to the gateway. FIG. 9 illustrates a larger radio network comprising a gateway and twelve RSNs. In such a radio network, messages from RSNs farther away from the gateway are hopped through intermediary RSNs on their way to the gateway.

Simply expanding the coverage area of the radio network, however, does not necessarily expand the range at which RSNs become aware of the radio network if beacons are only received by RSNs within range of the gateway. Thus, it is advantageous to expand the area in which beacons of a radio network can be "heard". An expanded area of beaconing increases the probability that RSNs will hear a beacon and join the radio network, as well as the probability that they will do so sooner and farther away than they would otherwise.

In order to effect this expansion of the beaconing area, RSNs connected to a gateway via the radio network are used to "repeat", i.e. retransmit, the gateway's beacon. In conventional systems, this is sometimes accomplished by requiring every node in a network to broadcast a beacon during a beacon interval, or alternatively by synchronizing the entire network.

In a radio network, however, the following methodology, described in the context of a radio network which includes a captured gateway and a plurality of RSNs, is preferably used.

Beacons are transmitted by the gateway at regular intervals, i.e. a beacon interval "Tb". When an RSN receives a beacon, the RSN selects a random variable between (Tb−X) and (Tb), where 0<X<Tb. The value of X is selected for each radio network and is tweaked appropriately for the radio network. If a time corresponding to the randomly selected variable passes before another beacon is received, then that RSN broadcasts its own beacon and resets its timer to the maximum value, i.e. Tb, such that it will not broadcast another beacon at least for a period corresponding to this maximum value. However, each RSN keeps track of an amount of time since it has broadcast a beacon of its own, and if this amount of time exceeds a "must beacon" interval, and the RSN still sees beacons of a lesser hop count, then the RSN will broadcast a beacon regardless of whether it has recently received a beacon. This allows distant RSNs to remain a part of a radio network even if statistics have worked out such that the RSN has a significantly reduced beacon rate. If an RSN does not receive a beacon after M*Tb, where M is an integer and M*Tb is greater than the "must beacon" interval, then the RSN decides that it has lost connection with the radio network and takes appropriate action to find it, or else goes free.

Figure 10:
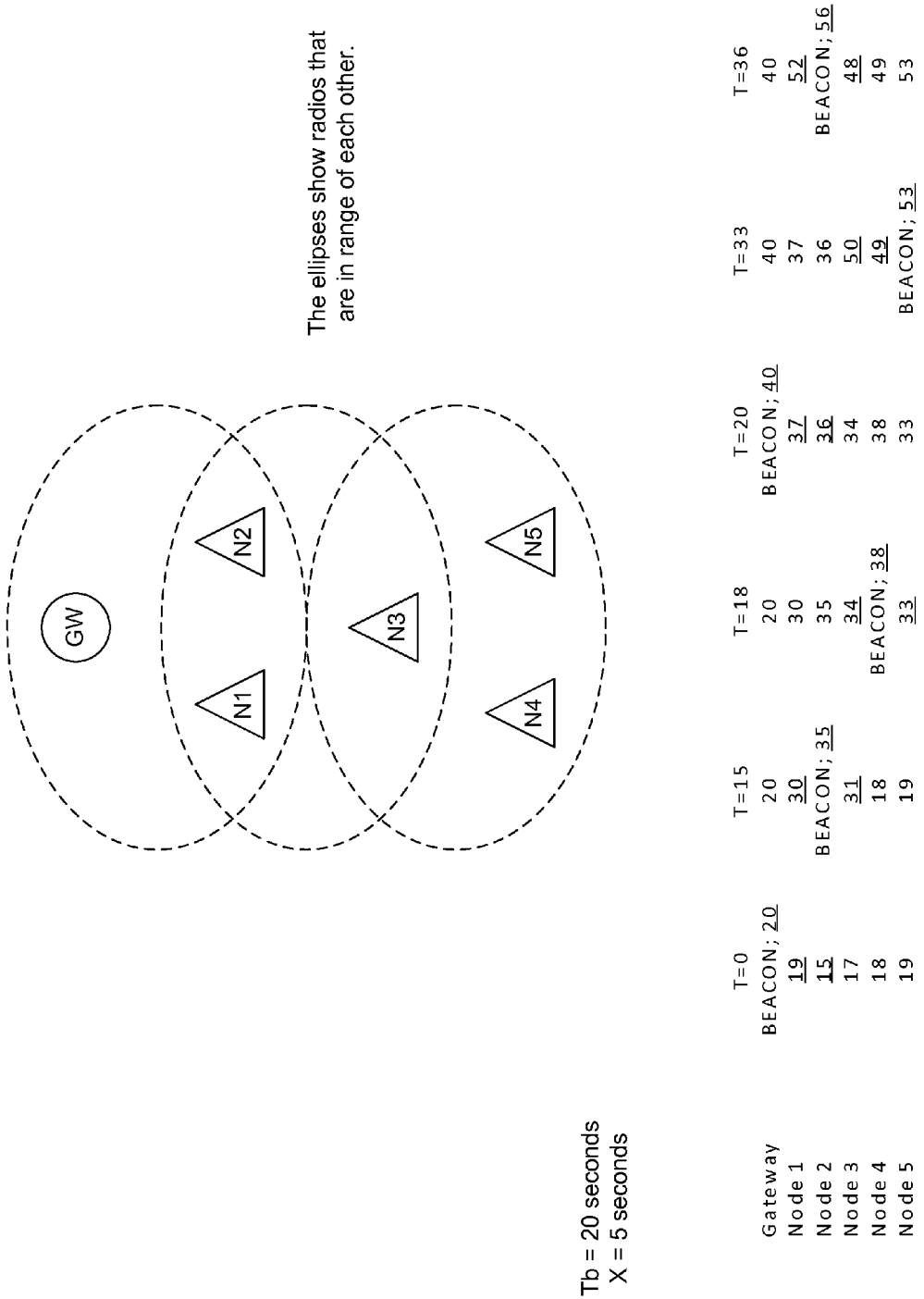
FIG. 10 illustrates a radio network comprising a captured gateway and five RSNs in accordance with a preferred embodiment of the present invention.

FIG. 10 illustrates a radio network comprising a captured gateway and five RSNs. The radio network is configured such that Tb=20 seconds and X=5 seconds. Thus, when an RSN receives a beacon, it randomly selects a value between (Tb−X), i.e. (20−5), or 15, and Tb, i.e. 20. This selected value between 15 and 20 is then set as a countdown timer for determining when to broadcast a beacon. The table of FIG. 10 (144—9A) provides an example of beaconing in the radio network of FIG. 10. More specifically, each column of the table represents a specific time value, from T=0 to time T=36. The first row of the table is associated with the gateway of the radio network, and each subsequent row is associated with an RSN of the radio network. Each field corresponding to a row and column represents a next beacon time value of the gateway/RSN associated with that row at the time represented by that column. Each next beacon time value indicates the time at which that particular RSN/gateway is next configured to beacon based on a countdown timer of that RSN/gateway. Notably, this next beacon time value represents the time T at which each RSN's respective timer will expire, rather than indicating the amount of time left until the timer expires. Further, although countdown timers are preferably utilized, it will be appreciated that alternative timing methodologies may be utilized in various, alternative implementations. Further, in the table, broadcasting of a beacon, by a particular gateway/RSN, is indicated by "BEACON", and resetting of a countdown timer, at a particular time T by a gateway/RSN, is indicated by an underlining of the next beacon time value of the field corresponding to that RSN/gateway and that time value T.

As can be seen in the table, at time T=0, the gateway broadcasts a beacon. This beacon is received by RSNs 1 and 2, each of which sets its timer to a random interval between Tb−X (in this example, 20−15, i.e. 5 seconds) and Tb (in this example, 20 seconds). Here, RSN 1 sets its timer to expire in 19 seconds, i.e. at time T=19, and RSN 2 sets its timer to expire in 15 seconds, i.e. at time T=15. It will be appreciated that both of these values fall between 15 and 20, as specified. Note that RSNs 3, 4, and 5 do not receive the beacon broadcast by the gateway, and thus do not reset their timers. After broadcasting this beacon, the gateway resets its timer to 20 seconds such that it will broadcast another beacon at time T=20.

At time T=15, RSN 2's timer expires, thus causing RSN 2 to broadcast a beacon. This beacon is received by RSNs 1 and 3. In response, RSNs 1 and 3 each reset their timers to a random period between 15 and 20 seconds. RSN 1 resets its timer t1 to expire in 15 seconds, i.e. at time T=30, and RSN 3 resets its timer to expire in 16 seconds, i.e. at time T=31. RSNs 4 and 5, being out of broadcast range of RSN 2, do not receive the beacon broadcast by RSN 2 and thus do not reset their timers. RSN 2, after broadcasting the beacon, resets its timer to the maximum period, i.e. Tb, or 20, such that its timer will expire at time T=35.

At time T=18, RSN 4's timer expires, thus causing RSN 4 to broadcast a beacon. This beacon is received by RSNs 3 and 5, which, in response, each reset their timer to a random period between 15 and 20 seconds. RSN 3 resets its timer to expire at time T=34, and RSN 5 resets its timer to expire at time T=33. RSNs 1 and 2 are out of broadcast range of RSN 4, and thus do not reset their timers. RSN 4, after broadcasting the beacon, resets its timer to expire at time T=38.

At time T=20, the gateway broadcasts a beacon, which is received by RSNs 1 and 2, causing each of them to reset their timer to a random period between 15 and 20 seconds. RSN 1 resets its timer to expire at time T=37, and RSN 2 resets its timer to expire at time T=36. RSNs 3, 4, and 5, being out of broadcast range, do not receive the beacon broadcast by the gateway and thus do not reset their timers. After broadcasting this beacon, the gateway resets its timer to expire at time T=40.

At time T=33, RSN 5's timer expires, thus causing RSN 5 to broadcast a beacon. This beacon is received by RSNs 3 and 4, which, in response, each reset their timer to a random period between 15 and 20 seconds. RSN 3 resets its timer to expire at time T=50, and RSN 4 resets its timer to expire at time T=49. RSNs 1 and 2 are out of broadcast range of RSN 5, and thus do not reset their timers. RSN 5, after broadcasting the beacon, resets its timer to expire at time T=53.

At time T=36, RSN 2's timer expires, thus causing RSN 2 to broadcast a beacon. This beacon is received by RSNs 1 and 3, which, in response, each reset their timer to a random period between 15 and 20 seconds. RSN 1 resets its timer to expire at time T=52, and RSN 3 resets its timer to expire at time T=48. Notably, RSN 3 actually resets its timer to expire sooner than it was previously set to expire. RSNs 4 and 5 are out of broadcast range of RSN 2, and thus do not reset their timers. RSN 2, after broadcasting the beacon, resets its timer to expire at time T=56.

It will be appreciated that this method allows for an organized use of a channel when many RSNs are gathered together. Further, it helps to extend the range of a radio network when RSNs are much farther apart, while minimizing the amount of power required to maintain the network. In accordance with the above-described methodology, RSNs will beacon less often on average than under a conventional pattern of beaconing every Tb. Notably, this method can be utilized with non-radio networks as well, and in fact can be utilized with both synchronous and asynchronous networks, although works best with an asynchronous network.

Gateways

A gateway is responsible for maintaining connectivity with a gateway server in order to remain operational. A free gateway, i.e. one that is not connected to a gateway server, is not operational and will not broadcast a beacon, and will refuse communications of any kind from RSNs. When free, a gateway continuously attempts to connect to its known gateway server.

Notably, multiple gateways can be connected to a single gateway server, and in fact multiple gateways can exist in close physical proximity to each other, all being connected back to a single gateway server. (Moreover, multiple gateways in close physical proximity could also be connected to different gateway servers, in which case each would be associated with a distinct Area ID, and thus belong to a distinct coverage island, as described more fully hereinbelow. In some situations, two such islands could in fact merge together, as described more fully further hereinbelow.)

As described above, each gateway preferably includes a gateway RSN, although does not necessarily have to. Each gateway RSN is functionally equivalent to a standard RSN with a few exceptions. A receiver of each gateway RSN is always active, and therefore a repeated WU_ATTN frame is not required prior to data transmission. This can be changed, however, i.e. nodes can select and indicate whether they maintain a receiver that is always active.

Additionally, gateway RSNs do not perform any application layer protocol parsing. Rather, gateway RSNs pass application layer datagrams, as well as all non-acknowledgment network datagrams to a gateway processing element. It will be understood, as described hereinabove, that the gateway provides auto-acknowledgment capability that a datagram reached the gateway. Notably, this acknowledgment is provided irrespective of the gateway's ability to communicate with a gateway server.

The processing element of a gateway provides a very limited set of processing functions, generally comprising two way protocol conversion between a node network and a gateway server. Inbound datagrams are converted to an XML style format for transmission to the gateway server, and outbound XML formatted datagrams are converted to appropriate node-network level datagrams for communication via the gateway RSN.

When captured, a gateway is preferably in continuous communication with its gateway server, thus ensuring normal node communications. However, a gateway also allows for intermittent communication with a gateway server and does not immediately become free upon losing connectivity with its gateway server. Instead, a timeout period is utilized. During the timeout period, a gateway stores communications received from nodes that are intended for the gateway server. If communication with the gateway server is re-established, the gateway forwards these stored communications on to the gateway server. If, however, communication with the gateway server is not re-established, the gateway transitions to a free state and shuts down network operations. In this even, the gateway broadcasts an application level message across the node network indicating that the gateway is offline. Each node receiving this broadcast enters its own free state, and must then attempt to join a new network. Although some nodes may not receive this broadcast, routing mechanisms described hereinabove will cause all nodes to eventually transition to their free state and attempt to join a new network.

Gateway Servers

A gateway server's primary role is to provide network resolution, although the gateway server further provides all system application interfaces to external client applications. As noted hereinabove, a gateway server is associated with an Area ID. Preferably, each gateway server is assigned a unique Area ID by the managing entity.

As alluded to hereinabove, a gateway server maintains a database of known network members, e.g. nodes, a status of each, and known outbound path information for each, including the gateway each node is communicating through. This database is maintained in several ways.

First, as described hereinabove, path information of each inbound message, including a UID associated with each node traversed by the inbound message, is appended to that inbound message and is thus available to the gateway server. Additionally, as also described hereinabove, information is provided to the gateway server via NEXTHOP_UPDATE messages.

Utilizing this database, the gateway server is likely able to maintain a variety of possible return paths to each node. Outbound traffic which does not successfully make its way to a destination node can be retried utilizing a different path. Typically, an unsuccessful attempt is retried three times utilizing alternate paths. If each of these retries is unsuccessful, the gateway server can direct the message to be sent as a cascaded broadcast, which is sent to all nodes via all known, connected gateways. It will be appreciated that such a cascaded broadcast is network intensive and is avoided unless it is determined to be essential.

When all retries and communication mechanisms outbound to a node have been tried unsuccessfully, the node, rather than being immediately removed from the gateway server's database, is notated therein as being inactive. If communication is re-established with the node before a system-determined timeout period, which can be specified by a user, then the node is considered active once again. If, on the other hand, the time-out period expires before communication with the node is re-established, the node is removed from the database.

Transmission of an outbound messages to an inactive node is attempted one time, and then the message is either queued or discarded, and an appropriate indication is provided to any connected client application. A message is only queued for delivery to an inactive node if the message is marked as persistent. A mechanism allowing a client application to specify that a message is persistent will be enforced.

Presence

It will be appreciated that for some client applications, the regular determination of the presence of a node within a network, such as by use of a check-in message, is desirable in order to allow the client application to monitor and confirm the location of the node. To accomplish this, each node is configured to communicate a check-in message to its gateway at predefined intervals of time. This predefined interval of time, or check-in period, is communicated to each node via beacon, as noted hereinabove. Thus, "presence information" on each node can be gathered. The gateway communicates this presence information to the gateway server, which can then communicate it to one or more client applications.

Figure 11:
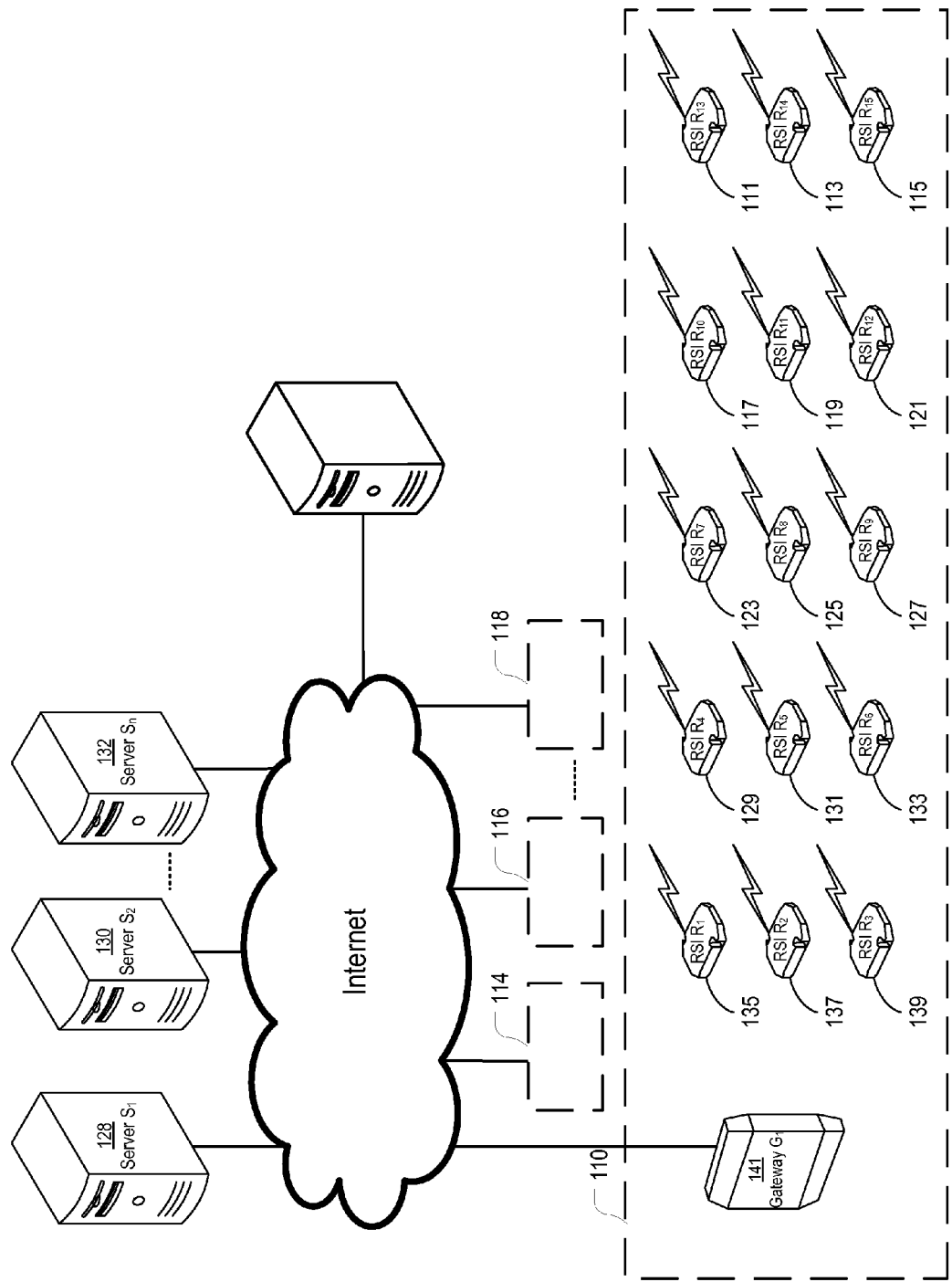
FIG. 11 illustrates a data communications network 110 having multiple user servers 128,130,132 and client applications as well as multiple locations, each having a presence server in accordance with a preferred embodiment of the present invention.

A client application which keeps track of presence information of a plurality of nodes can be characterized as a presence server. A client application may serve as a presence server for all nodes of a network, or alternatively for a subset thereof. The gateway server also may function as a presence server for one or more of the nodes. FIG. 11 illustrates a data communications network 110 having multiple user servers 128,130,132 and client applications as well as multiple locations, each having a presence server. For example, a plurality of nodes associated with shipments for Wal-Mart may be tracked, and the presence information thereof maintained, by a first presence server, while a plurality of nodes associated with shipments for Target may be tracked, and the presence information thereof maintained, by a second, different presence server, even though presence information (e.g., check-in messages) for both pluralities of nodes are communicated over the Internet by way of the gateway server.

Figure 12:
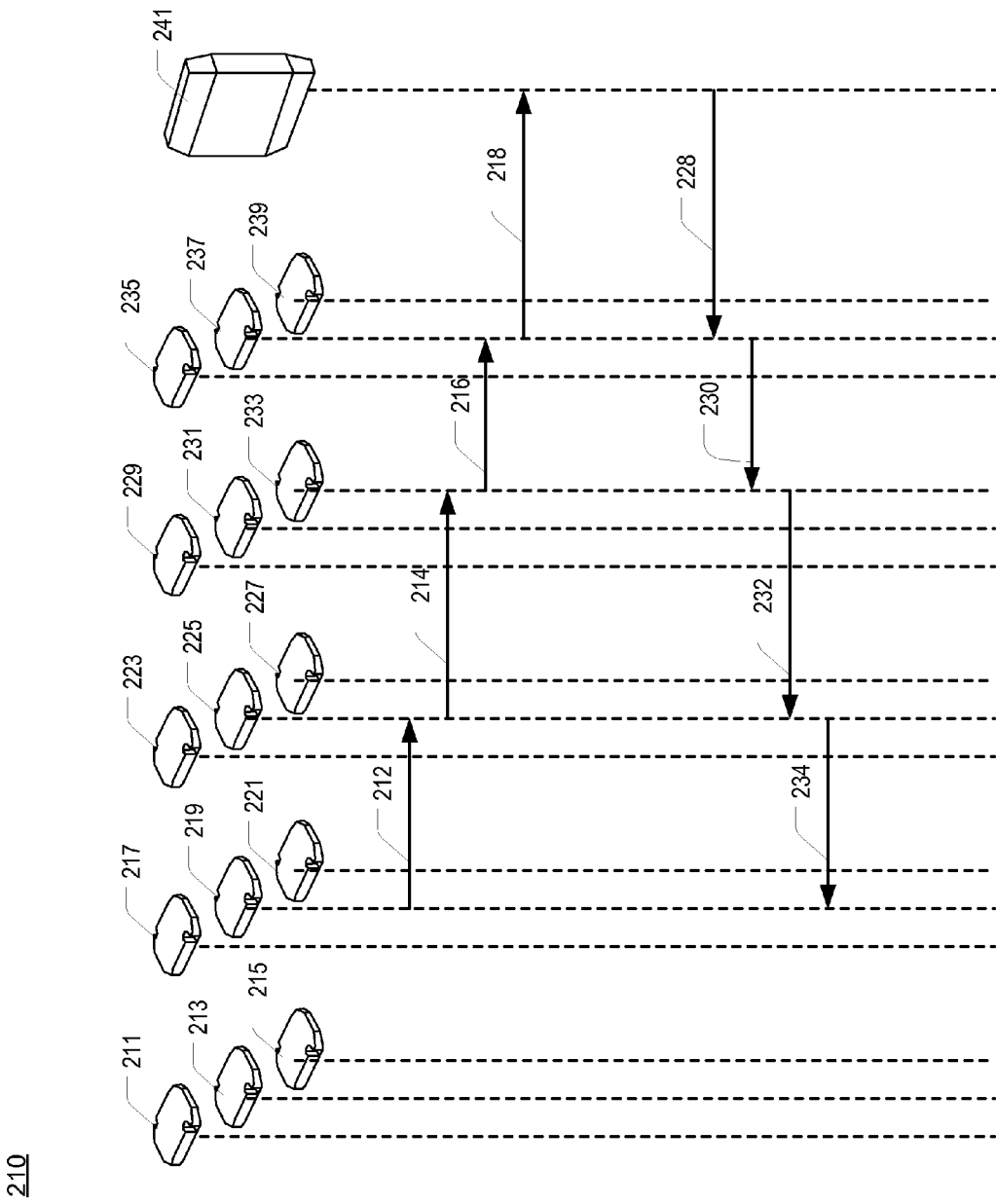
FIG. 12 illustrates an exemplary network 210 including fifteen nodes 211-239 in accordance with a preferred embodiment of the present invention.

FIG. 12 illustrates an exemplary network 210 including fifteen nodes 211-239 (odd). In FIG. 12, a check-in message originating at node 219 requires three hops to get from node 219 to the gateway 241. The path for the three hops is from node 225 to node 233 via hop 214; from node 233 to node 237 via hop 216; from node 237 to gateway 241 via hop 218. (Note that the initial transmission 212 by node 219 to node 225 is not considered or deemed a "hop" herein because it is the initial transmission, but this is a semantic difference.)

After the message has been communicated to the gateway 241, the gateway 241 returns an acknowledgment (hereinafter, "ACK") of the check-in message to the initiating node 219. The pathway by which the ACK is communicated is the reverse of the pathway by which the check-in message is communicated, and includes transmission 228 with hops 230, 232, and 234.

In total, communication of a check-in message from node 219 to the gateway 241 requires four total node transmissions (the initial transmission and three hops), and communication of an acknowledgment from the gateway 241 to the node 219 requires three node transmissions (each a hop) with the initial transmission being by the gateway 241.

It will be appreciated from the above description and FIG. 12 that nodes 211,213,215 each require four hops in communicating a check-in message to gateway 241; nodes 217,219, 221 each require three hops in communicating a check-in message to gateway 241; nodes 223,225,227 each require two hops in communicating a check-in message to gateway 241; nodes 229,231,233 each require one hop in communicating a check-in message to gateway 241. Nodes 235,237,239 do not require any hops in communicating a check-in message to gateway 241 as each directly communicates with the gateway 241.

The respective number of node transmissions for each of these sets of nodes is set forth in the table of FIG. 13. For example, nodes 211,213,215 each require eight hops or node retransmissions to communicate a check-in message and receive an acknowledgment back. Multiplying these eight required transmissions by the number of nodes, i.e. three, results in a total of twenty-four required node retransmissions for check-in messages from nodes 211,213,215 per check-in interval, e.g., every fifteen minutes.

It will be appreciated that having a large number of nodes with a pathway to the gateway router 241 including a large number of hops greatly increases the total number of node retransmissions required for check-in messages. As can be seen in the table of FIG. 13, the total number of node retransmissions required for a check-in message and corresponding acknowledgment for each of the fifteen nodes of network 210 is sixty.

This number can be reduced, however, by taking advantage of path information stored in inbound communications. Specifically, each communication of a check-in message preferably includes the UID of each node along the path the check-in message has actually been communicated along, as described hereinabove.

When the gateway 241 receives the check-in message from node 219, the gateway 241 identifies from the pathway the nodes along which the message has hopped, i.e., through intermediate nodes 225, 233, 237. In particular, the gateway 241 analyzes the message to determine the UID of each node along the pathway. Then, rather than only considering the check-in message of node 219, the gateway 241 further utilizes the UIDs of nodes along the path to determine the presence of these additional nodes. The presence information for each of these nodes consequently is updated.

Importantly, and as outlined hereinabove, the ACK that is sent to node 219 is sent along the reverse pathway by which the check-in message was sent to the gateway 241. This insures that each intermediate node receives and retransmits the ACK for delivery to node 219. In doing so, each intermediate node thereby receives its own acknowledgement that its presence, as indicated by the pathway information, has been acknowledged by the gateway 241.

In this respect, each intermediate node 225, 233, 237 remembers that it passed (hopped) an inbound check-in message from the initiating node 219 and, when it passes (hops) the ACK back to the initiating node 219, the intermediate node 225, 233, and 237 uses the ACK as a positive indication that the inbound check-in message was delivered. Based on this, each of the intermediate nodes 225, 233, and 237 causes its check-in timer to be reset to zero as if the respective node had sent a check-in message itself and received back an ACK. As such, none of the intermediate nodes will send its own check-in message until its respective time interval for doing so (starting at the time of retransmitting the ACK for delivery to node 219) has passed.

This methodology is utilized by a node not just when hopping check-in messages, but when hopping any inbound message. Thus, the intermediate nodes 225,233,237 benefit from hopping inbound messages, as each resets its chronometer (clock or timer) for counting down its check-in interval, none need to send a check-in message as quickly as it otherwise would have done if there had been no message hopping. As an example, the outside nodes 211,213,215 may send check-in messages every 15 minutes, with each of all of the other nodes serving as intermediate nodes for the outside nodes 211,213,215, whereby check-in messages for such intermediate nodes would not be required to be sent. In this scenario, only twenty-four retransmissions or hops thus are required, instead of 60 hops as set forth in the table of FIG. 13 (a sixty-percent reduction!).

Preferably, if a node must leave a network, such as, for example, due to a connection loss or a path loop, the node will broadcast a "leave" message, which alerts other nodes (and/or, in at least some preferred implementations, a gateway), especially those previously utilizing that node in a path, that that node can no longer be used in a path. This minimizes the chances of needing retries for subsequent transmissions, as nodes will not attempt to transmit messages to nodes which have broadcast that they have left the network, and thus reduces power requirements.

It is believed that above described implementations are advantageous in allowing presence information to be obtained not only for sensors and event types, but for people and assets as well, and even for data itself, i.e. information can be provided on whether manifests are present or queued events are present, and on previous locations it has been present (by virtue of state and status information).

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. In an ad hoc network in which inbound messages are communicated from an originating node to a gateway node via a plurality of intermediate nodes, a method performed by an intermediate node in communicating an inbound message to a gateway node, comprising the steps of:

maintaining, at a first node of the plurality of intermediate nodes, a routing table including a set of known intermediate nodes for use as a next hop towards a gateway node, the routing table comprising, for each known intermediate node, fields including, a next hop address, representing a unique address of the respective intermediate node, a next hop hopcount, representing a hop count to a gateway node, and a next hop qualifier, representing a preference for using the respective known intermediate node as a next hop towards a gateway node relative to other nodes that may be used as a next hop towards a gateway node;

receiving, at the first node, an inbound message for communication to a gateway node;

selecting, at the first node, a node for use as the next hop towards a gateway node for communicating the inbound message to a gateway node by, determining, for two or more known intermediate nodes maintained in the routing table, whether a sum of the next hop hopcount maintained in the routing table for the respective known intermediate node and a current hopcount of the inbound message exceeds a maximum number of allowable hops for the inbound message, and comparing next hop qualifiers maintained in the routing table for two or more known intermediate nodes for which the maximum number of allowable hops for an inbound message is not exceeded;

communicating, by the first node, the inbound message to the node identified by the next hop address for which the next hop qualifier is determined to be preferred based on said comparison;

receiving, at the first node, an acknowledgment from the known intermediate node the inbound message was communicated to; and updating, at the first node based at least partially on information contained in the received acknowledgment, the next hop qualifier maintained in the routing table for the known intermediate node the acknowledgment was received from.

2. The method of claim 1, wherein the gateway node maintains pathways among the nodes based on the messages received from each of the other nodes.

3. The method of claim 1, wherein the next hop qualifier is determined, at least in part, based on transmission failure counts of the node to which the next hop qualifier pertains.

4. The method of claim 1, wherein the next hop qualifier is determined, at least in part, based on signal strength of the node to which the next hop qualifier pertains.

5. The method of claim 1, wherein the next hop qualifier represents both efficiency and success probability associated with using the node to which the next hop qualifier pertains as the next hop towards the gateway node for communicating the inbound message.

6. The method of claim 1, wherein an intermediate node does not maintain a routing table of entire pathways from the originating node to the gateway node.

7. The method of claim 1, further comprising transmitting a message for receipt by each hop address in the table when the intermediate node leaves the ad hoc network.

8. The method of claim 1, further comprising transmitting a leaving message for receipt by nodes corresponding to each next hop address in the table when the intermediate node leaves the ad hoc network.

9. The method of claim 1, wherein the ad hoc network comprises a class-based network.

10. The method of claim 9, wherein the set of one or more rows is associated with a first class, and wherein a second set of one or more rows is associated with a second class.

11. In an ad hoc network in which inbound messages are communicated from an originating node to a gateway node via a plurality of intermediate nodes, a method performed by an intermediate node in communicating an inbound message to a gateway node, comprising the steps of:

maintaining, at a first node of the plurality of intermediate nodes, a routing table including a set of known intermediate nodes for use as a next hop towards a gateway node, the routing table comprising, for each known intermediate node, fields including, a next hop address, representing a unique address of the respective intermediate node, a next hop hopcount, representing a hop count to a gateway node, and a next hop qualifier, representing a preference for using the respective known intermediate node as a next hop towards a gateway node relative to other nodes that may be used as a next hop towards a gateway node;

receiving, at the first node, an inbound message for communication to a gateway node;

selecting, at the first node, a node for use as the next hop towards a gateway node for communicating the inbound message to a gateway node by, determining, for two or more known intermediate nodes maintained in the routing table, whether a sum of the next hop hopcount maintained in the routing table for the respective known intermediate node and a current hopcount of the inbound message exceeds a maximum number of allowable hops for the inbound message, and comparing next hop qualifiers maintained in the routing table for two or more known intermediate nodes for which the maximum number of allowable hops for an inbound message is not exceeded; and communicating, by the first node, the inbound message to the node identified by the next hop address for which the next hop qualifier is determined to be preferred based on said comparison.

12. The method of claim 11, wherein the gateway node maintains pathways among the nodes based on the messages received from each of the other nodes.

13. The method of claim 11, wherein the next hop qualifier is determined, at least in part, based on transmission failure counts of the node to which the next hop qualifier pertains.

14. The method of claim 11, wherein the next hop qualifier is determined, at least in part, based on signal strength of the node to which the next hop qualifier pertains.

15. The method of claim 11, wherein the next hop qualifier represents both efficiency and success probability associated with using the node to which the next hop qualifier pertains as the next hop towards the gateway node for communicating the inbound message.

16. The method of claim 11, wherein an intermediate node does not maintain a routing table of entire pathways from the originating node to the gateway node.

17. The method of claim 11, further comprising transmitting a message for receipt by each hop address in the table when the intermediate node leaves the ad hoc network.

18. The method of claim 11, wherein the ad hoc network comprises a class-based network.

19. The method of claim 18, wherein the set of one or more rows is associated with a first class, and wherein a second set of one or more rows is associated with a second class.

20. In an ad hoc network in which inbound messages are communicated from an originating node to a gateway node via a plurality of intermediate nodes, a method performed by an intermediate node in communicating the inbound message to the gateway node, comprising the steps of:

maintaining a routing table including a set of one or more rows, wherein each row of the set comprises fields including, a next hop address, representing a unique address of a node, a next hop hopcount, representing a hop count to the gateway, and a next hop qualifier, representing a preference to using a node as a next hop towards a gateway node relative to other nodes that may be used as a next hop towards a gateway node, all fields of the row pertaining to a known intermediate node for use as a next hop towards the gateway node;

selecting a node for use as the next hop towards the gateway node for communicating the inbound message to the gateway node by, determining whether a sum of the next hop hopcount from a row and a current hopcount of the inbound message exceeds a maximum number of allowable hops for an inbound message, and comparing a next hop qualifier of a row to a next hop qualifier of another row, wherein, for both rows, the maximum number of allowable hops for an inbound message is not exceeded; and wherein the ad hoc network comprises a class-based network; and wherein each row of the routing table is associated with a class.

* * * * *